(12) United States Patent
Kisak et al.

(10) Patent No.: US 7,131,614 B2
(45) Date of Patent: Nov. 7, 2006

(54) LOCOMOTIVE CONTROL SYSTEM AND METHOD

(75) Inventors: Jeffrey Kisak, Erie, PA (US); Bradley C. Hendrickson, Erie, PA (US); Ajith Kuttannair Kumar, Erie, PA (US); Daniel Ballesty, Wattsburg, PA (US); Gerald J. Hess, Jr., Erie, PA (US); Stephen Matthew Pelkowski, Erie, PA (US)

(73) Assignee: General Electric Company, Schenectady, NY (US)

( * ) Notice: Subject to any disclaimer, the term of this patent is extended or adjusted under 35 U.S.C. 154(b) by 119 days.

(21) Appl. No.: 10/849,314

(22) Filed: May 19, 2004

(65) Prior Publication Data

US 2004/0245410 A1  Dec. 9, 2004

Related U.S. Application Data

(60) Provisional application No. 60/474,151, filed on May 22, 2003.

(51) Int. Cl.
*B61L 3/00* (2006.01)

(52) U.S. Cl. .................. 246/167 R; 246/3; 246/187 A; 246/167 R; 340/825.36; 701/19

(58) Field of Classification Search .................. 701/19, 701/20; 246/167 R, 187 A, 187 C, 122 R, 246/122 A, 14, 3; 340/825.36, 825.49, 988, 340/933; 105/61
See application file for complete search history.

(56) References Cited

U.S. PATENT DOCUMENTS

| | | | |
|---|---|---|---|
| 5,696,482 A * | 12/1997 | Kaiser et al. .......... 340/426.25 |
| 5,794,172 A | 8/1998 | Matheson et al. | |
| 6,459,965 B1 | 10/2002 | Polivka et al. | |
| 6,523,787 B1 * | 2/2003 | Braband ........................ 246/3 |
| 6,622,068 B1 | 9/2003 | Hawthorne | |
| 2003/0236601 A1 * | 12/2003 | McLeod et al. .............. 701/29 |
| 2004/0006413 A1 * | 1/2004 | Kane et al. ................... 701/19 |

* cited by examiner

*Primary Examiner*—Frantz F. Jules
(74) *Attorney, Agent, or Firm*—Senniger Powers; Carlos Hanze

(57) ABSTRACT

The invention includes a system and method for managing an operation of a locomotive as a function of a location of the locomotive. The system comprises a location unit for determining the location of the locomotive and a control unit for controlling an operation of the locomotive as a function of the determined location. In another embodiment, the invention includes a system and method for receiving a security authorization input from an operator of the locomotive, comparing the received operator security authorization input to a security authorization parameter, and restricting an operation of the locomotive when the received operator security authorization input does not match the security authorization parameter. In yet another embodiment, the invention includes a system and method of sending a control command from a remote system, receiving the control command at the locomotive, and controlling an operation of the locomotive responsive to the received control command. In still another embodiment, the invention includes a system and method for controlling an operation of the locomotive as a function of the location of the locomotive, a monitored emission parameter and an emission characteristic.

18 Claims, 3 Drawing Sheets

LOCOMOTIVE CONTROL SYSTEM AND METHOD

CROSS REFERENCE TO RELATED APPLICATIONS

The invention of the present application claims priority based on U.S. Provisional Application Ser. No. 60/474,151, filed on May 22, 2003.

FIELD OF THE INVENTION

The invention relates generally to the operation and control of an Off highway vehicles (OHV) such as a railway locomotive. In particular, the invention relates to a system and method for controlling one or more operations of OHV as a function of a location of the OHV, a security authorization of an operator, an emission objective, or a remote control command.

BACKGROUND OF THE INVENTION

A locomotive control system controls the operation of a locomotive in response to input from an operator. The operator provides an input into the locomotive to initiate one or more operation of the locomotive or to change a mode of operation. Operator inputs include setting the throttle to a particular notch setting or adjusting the reverser. Typical modes of operation of a locomotive include motoring, dynamic braking, self-load, idle, shutdown, start-up, cranking, and a throttle setting such a motor notch 5. The locomotive control system responds to the inputs from the operator to control the operation of the locomotive in response to the operator defined modes and other control inputs.

The locomotive control system has been implemented not only in locomotives that operate independently, but also in multiple locomotives that operate together in a consist for providing cumulative or reserve motoring capacity, for example in commonly assigned U.S. Pat. No. 6,691,957. The front locomotive in the consist is usually where an operator is located and is usually designated the lead unit while the other locomotives are designated trail units. However, the lead locomotive may be any locomotive within a consist. Each trail unit typically receives a trainline signal representing the position of the lead unit's reverser, and treats that signal as representing the position of its own reverser. The reverser is typically placed in the center position when configuring the locomotive for trail unit operation. While trail units are controlled by an operator located in another locomotive, each of the locomotives operating in a consist either directly or indirectly respond to the input commands of the locomotive operator.

There is increased concern for the security of transportation systems including improving security and restricting control over the operation of railway locomotives. Therefore, there is a need for a system and method that provides increased security to the operation of a locomotive. As one method of providing increased security, it would be desirable to remotely control an operation of a locomotive wherein the remote control operation would override the operator input command and restrict one or more operations of the locomotive. However, the present state of locomotive technology does not offer a railway system operator a mechanism to remotely intervene with locally controlled detrimental locomotive operation. Therefore, there is a need for a remote control system that can remotely control the operation of a locomotive wherein such remote control commands override input of the operator that is located on-board the locomotive. There is also a need to remotely control a locomotive such that an operator is not required to be in a locomotive at the time of operation of the locomotive. To support this remote control system, there is also a need to provide a secure communication channel or facility between a remote control system and a locomotive for communicating messages and delivering remote control commands.

Additionally, it would be desirable to control the operation of a locomotive based on the geographic location of the locomotive. For instance, a rail system operator operating a locomotive over a railway network may find it desirable to identify operating areas within the railway network such that one or more operations of the locomotive would be determined as a function of the location of the locomotive. For example, an emission objective may be established for a particular operating area. It may be desirable to control the operation of the locomotive based on the location of the locomotive, an emission parameter of the locomotive, and an emission characteristic or objective established for the locomotive. The present state of locomotive technology does not offer a railway system operator a mechanism to manage or control the operation of a locomotive based on the geographic location of the locomotive or based on an emission characteristic for an operating area and/or locomotive.

SUMMARY OF THE INVENTION

In another aspect, the invention relates to a method for managing operation of a locomotive that moves between at least two operating areas. The locomotive includes at least two profiles of operation. The locomotive travels along a path comprised of at least two operating areas, each operating area having at least one location profile associated therewith, with the location profile of one operating area being different from that of a second area. The method comprising includes monitoring a location of the locomotive to determine its operating area. The method also includes controlling an operation of the locomotive as a function of the determined operation area and the associated location profile. The location profile is selected from the group comprising a security profile and an emissions profile. The security profile includes a restriction on an operation of the locomotive based on its position relative to a security control area. The emissions profile includes a restriction on an operation of the locomotive based on its position relative to an emission control area.

In another aspect, the invention relates to a method of secure operation of a locomotive as a function of a location of the locomotive and a security parameter of the locomotive. The method includes determining the location of the locomotive. The method further includes determining the security parameter for the locomotive as a function of the determined location of the locomotive. The method further includes receiving a security authorization input from an operator of the locomotive. The method further includes determining a control parameter as a function of the location of the locomotive and the comparison of the received security authorization input from the operator and the determined security parameter. The method also includes controlling an operation of the locomotive responsive to the control parameter.

In another aspect, the invention is a method for managing an operation of a locomotive comprising receiving a security authorization input from an operator of the locomotive and comparing the received operator security authorization input to a security authorization parameter. The method further provides for restricting an operation of the locomotive when the received operator security authorization input does not match the security authorization parameter.

In yet another aspect, the invention relates to a method of operating a locomotive as a function of a location of the locomotive and an emission characteristic of the locomotive. The method comprises determining the location of the locomotive and determining the emission characteristic for the locomotive as a function of the determined location of the locomotive. The method also includes monitoring an emission parameter of the locomotive and determining a control parameter as a function of the location of the locomotive and as a function of the monitored emission parameter and the determined emission characteristic. The method also includes controlling an operation of the locomotive responsive to the control parameter.

In another aspect, the invention is a system for managing an operation of a locomotive as a function of a location of the locomotive, the system comprising a location unit determining the location of the locomotive. The system also includes a memory for storing two or more operating profiles of the locomotive, a geographically defined operating area, and a security authorization parameter. An operator authorization input device is included for receiving a security authorization input from an operator of the locomotive. A processor provides for determining the operating profile of the locomotive as a function of the location of the locomotive as compared to the operating area stored in memory, and comparing the received operator security authorization input to the security authorization parameter, the processor generating a security alert when the received operator security authorization input does not match the security authorization parameter. A communication unit provides for transmitting the security alert to a remote control system and receiving a control parameter from the remote control system, and a control unit provides for controlling an operation of the locomotive responsive to the received control parameter.

In yet another aspect, the invention is a locomotive control system for a locomotive comprising a memory device for storing computer instructions and a processor including an input for receiving a signal indicative of a security alert condition. The processor executes the computer instructions stored in the memory device. The computer instructions configure the processor to output one or more commands to restrict or inhibit an operation of the locomotive when a signal indicative of a security alert condition is received. Also included is a control unit for controlling the locomotive in response to a command output by the processor.

In another aspect, the invention is a system for managing an operation of a locomotive as a function of a location of the locomotive. The system comprises a location unit determining the location of the locomotive and a processor for determining a security alert condition as a function of the determined location. Also included is a communication unit transmitting the determined security alert condition to a remote system and receiving a control parameter from the remote system, and a control unit for controlling an operation of the locomotive responsive to the received control parameter.

In yet another aspect, the invention is a system for managing an operation of a locomotive as a function of a location of the locomotive and a security parameter of the locomotive. The system comprises a control unit for controlling an operation of the locomotive responsive to a control parameter, and a location unit determining the location of the locomotive. Also included is a communication unit transmitting the determined location of the locomotive and receiving the control parameter, and a communication interface receiving the transmitted location of the locomotive and transmitting the control parameter to the locomotive. A processor determines the security parameter and determines the control parameter as a function of the location of the locomotive and the determined security parameter.

In another aspect, the invention relates to a system for managing an operation of a locomotive as a function of a location of the locomotive and an emission characteristic. The system comprises a location unit determining the location of the locomotive and a monitor unit monitoring an emission parameter of the locomotive. A processor determines an emission characteristic of the locomotive as a function of the location of the locomotive and determines a control command as a function of the monitored emission parameter and the emission characteristic. The system also includes a control unit controlling an operation of the locomotive responsive to the received control parameter.

Other aspects and features of the present invention will be in part apparent and in part pointed out hereinafter.

BRIEF DESCRIPTION OF THE DRAWINGS

Corresponding reference characters and designations generally indicate corresponding parts throughout the drawings.

DETAILED DESCRIPTION

Figure 1:
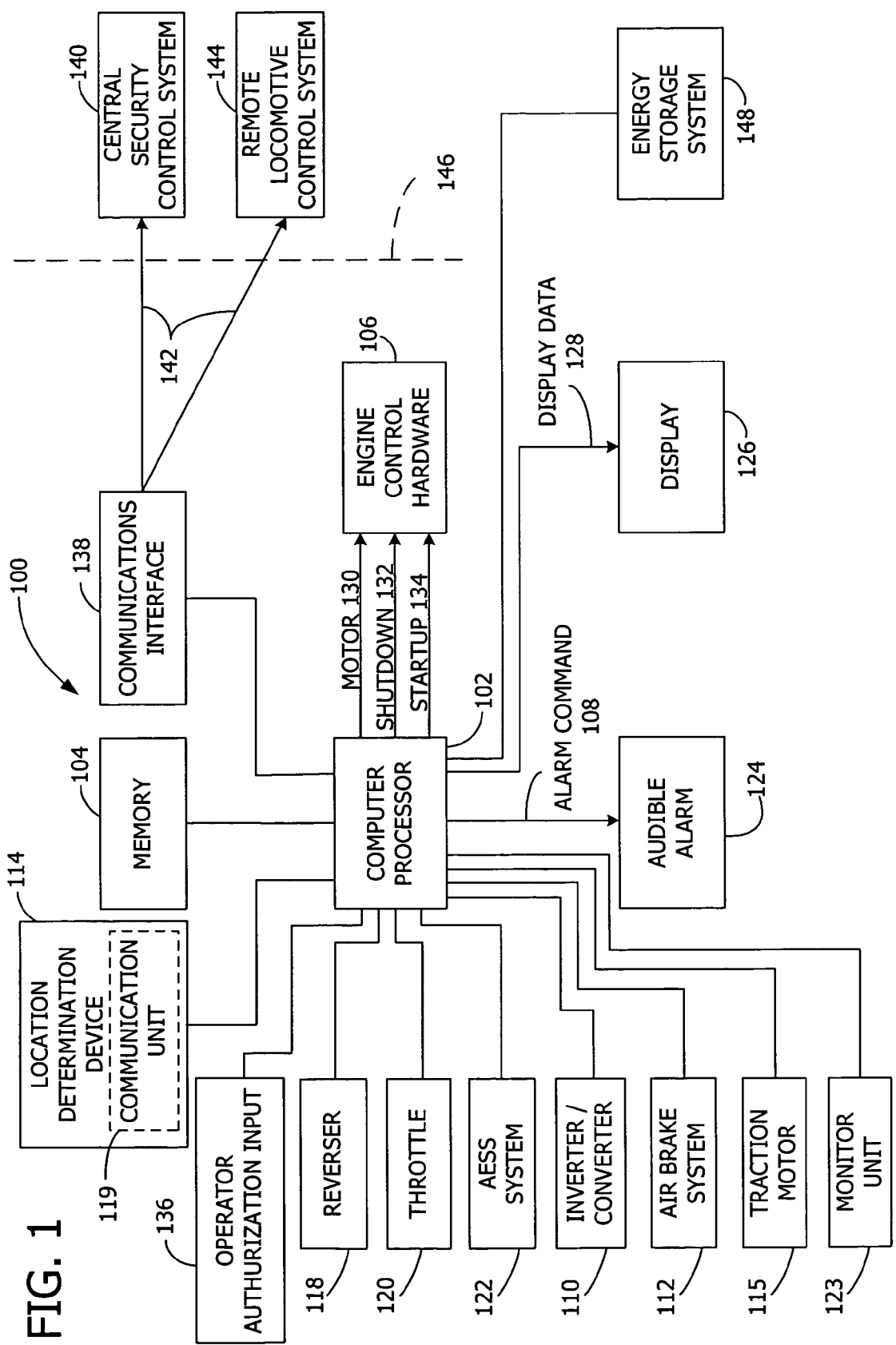
FIG. 1 is a functional block diagram of a locomotive control system according to one embodiment of the invention.

A vehicle control system according to one embodiment of the present invention is illustrated in FIG. 1 and indicated generally by reference character 100. As shown in FIG. 1, the control system 100 includes a computer processor 102, a memory device 104, and engine control hardware 106. Memory 104 may comprise multiple static and/or dynamic memory devices, as is common. Computer processor 102 may be provided with inputs for receiving signals from a reverser 118, a throttle 120, a location determination device 114, a communication interface 138, an operator authorization input 136 and other components of a vehicle as will be discussed.

The optional location determination device 114 may be any system configured to determine a location of a vehicle such as a locomotive. The location of the locomotive may be a specific location such as a longitude and latitude, or may be a position or placement relative to a boundary. In one embodiment, location determination device 114 is a Global Positioning Satellite (GPS) receiver and system. In another embodiment, location determination device 114 is a device located adjacent one or more rails (wayside) for detecting the presence of a particular locomotive. Such detection mechanisms may include a barcode reader or may be a wireless communication device, such as an AEI (Automated Equipment Identification) RF tag reader, either of which would provide for the identification of a particular locomotive at a particular location of the railway network or in relation to a boundary of an operating area. For example, location determination device 114 may include a communication unit 119 such as a wayside transmitter or transponder that transmits boundary or location identifying signals. Receivers located on the locomotive receive the transmitted signals, thereby providing location determination device 114 with a determination of the location of the locomotive or the location of the locomotive relative to a boundary of an operating area.

Optional signals from reverser 118 and throttle 120 may indicate the respective positions of the locomotive's reverser 118 and throttle 120. The optional signals from Automatic Engine Start and Stop (AESS) system 122 may indicate the one or more parameters of AESS system 122.

Control system 100 further includes an audible alarm 124 and a display device 126. Audible alarm 124 may sound in response to receiving an alarm command 108 from computer processor 102. In one embodiment, alarm 124 is a trainline alarm which, when activated, sounds within each locomotive in a consist. Display device 126 may display data 128 received from computer processor 102 including, when applicable, data indicating that one or more operations of the locomotive or another locomotive in the consist have been controlled or disabled. Display device 126 may also indicate the status of the security profile of the locomotive, faults in one or more locomotive systems, prompt an operator for an authorization input, report on security alert conditions, etc. In one embodiment, display data 128 is first received by computer processor 102 over a trainline communication system, and indicates a control or security condition of another locomotive.

Operator authorization input device 136 may be any device configured to determine the authorization and/or authentication of the operator of the locomotive. Examples of such operator authorization input device 136 includes a card reader, a key, a keyboard for entry of a User ID and password, a retinal scanner, a fingerprint scanner, a hand scanner, a voice recognition device, etc. Operator authorization input device 136 provides the ability for control system 100 to verify the authorization and authentication of a person attempting to operate the locomotive. Additionally, operator authorization input device 136 enables control system 100 to establish authorization parameters or authorization levels for the operators and required minimum parameter or level for particular operations, operating modes, and/or operating profiles.

Those skilled in the art will recognize that control system 100 may include components in addition to those shown in FIG. 1, and that computer processor 102 may include inputs and outputs in addition to those shown in FIG. 1.

Memory 104 stores computer instructions to be executed by computer processor 102. These computer instructions configure computer processor 102 to output one or more commands when one or more predefined conditions exist. Memory 104 may be any computer-readable medium having computer-executable instructions recorded thereon for implementing any one or more of the system and methods described herein. For example, computer processor 102 may output a motor command 130 in response to signals from reverser 118 and throttle 120 indicating an operator's attempt to motor (i.e., move) the locomotive. Engine control hardware 106 controls the locomotive engine (not shown) in response to commands output by computer processor 102, including a motor command 130, a shutdown command 132, and a startup command 134. As apparent to those skilled in the art, engine control hardware 106 may include a variety of components including relays, a fuel pump, etc. Additionally, computer processor 102 may output other control commands for controlling one or more other operations or operational characteristics of the locomotive. These include, but are not limited to controlling reverser 118, throttle 120, automatic engine start and stop (AESS) system 122, an inverter/converter 110, an alternator (not shown), air brakes 112, electronic parking brakes (not shown), traction motors 115, energy storage system 148, or one or more emission characteristic monitors 123. In one embodiment, the locomotive is configured with an operator authorization input device 136. Computer processor 102 may control or limit the operating mode or characteristic of the locomotive or locomotive engine, including motoring, dynamic braking, electronic parking braking, engine cranking, command engine to idle, engine shutdown, remove or limit tractive effort, engine timing, fuel mixture, engine cooling, command energy storage, command engine load or tractive effort, energy storage, stored energy use, and the application or release of automatic or independent air brakes.

Control system 100 may be configured on a single locomotive or another support railway vehicle such as a tender vehicle. Components of control system 100 may in other embodiments be distributed in part to one or more vehicles or locations that are remote from the locomotive. Additionally, control system 100 may be configured to operate as a standalone system autonomous from any other system or may configured to operate in conjunction with one or more remote systems. As denoted in FIG. 1 by line 146, systems may be remote from the locomotive or control system 100 and communicate and cooperate with control system 100. For example, a central security control system 140 and/or a remote locomotive control system 144, or one or more railway operational systems (not shown), may be remote from control system 100, as indicated by line 146. In these embodiments, the remote system may communicate with control system 100 by means of a communication interface 138 that provides a communication facility between computer processor 102 a remote system. In these cases, communication interface 138 would interface with a secure communication link 142 to provide secure communication between control system 100 and the remote system.

In another embodiment, a remote locomotive control system 144 is in communication with control system 100 via secure communication link 142. Remote locomotive control system 144 is configured to provide remote control commands to control system 100 such that an off-board operator (i.e., an operator located somewhere other than on board the locomotive) can remotely control one or more operations of the locomotive. Such commands may include providing operating profiles to the locomotive as described herein that define and specify one or more operating characteristics, limitations, restrictions, etc. Remote locomotive control system 144 may also be configured to monitor the location, an operating characteristic or operating parameter of the locomotive which may be utilize to determine the appropriate commands to be issued to control system 100.

Control system 100 may be configured to override inputs or commands of an operator or as determined by control system logic to implement the remote control commands of remote locomotive control system 144. In another embodiment, remote control commands of remote locomotive control system 144 may be overridden by an operator or by control system 100. In such instances, an override may require an additional authorization by the operator, e.g., in an emergency. Remote control logic of remote locomotive control system 144 may include any logic or may be a remote control device operated by yardman or railway worker who is located at a remote location from the locomotive such as in a control tower.

In yet another embodiment, central security control system 140 is in communication with control system 100 via secure communication link 142. Central security control system 140 may perform similar remote control functions as remote locomotive control system 144 but may specifically monitor and manage the control of security and security-related functions of the locomotives operating in a railway system. Thus, if an operator on board the locomotive is immobilized and/or otherwise unable to control operation of the locomotive (e.g., runaway train), remote control commands can be used shutdown the locomotive. For example, if the operator on board the locomotive is immobilized remote control commands can be used to activate a dump valve (not shown) to dump air pressure and automatically engage air brakes.

Moreover, central security control system 140 may assign and manage authorization parameters or levels and security operating profiles for the locomotives and may assign such parameters, levels or security operating profiles to the operating areas of a railway track network system (discussed below in further detail). Central security control system 140 may define security algorithms or comparison of operator authorization input 136 with the predefined security authorization parameter or level. Additionally, central security control system 140 may establish restrictions or limitations on the locomotive and one or more operations of the locomotive based on the location of the locomotive within or outside of a security control area, or based on the authorization of the operator of the locomotive. For instance, if a train is transporting hazardous materials the locomotive may be restricted from railway routes that would require the train to travel through tunnels and/or bridges. As another example, if particular sections of a railway track are under maintenance, the locomotive may be restricted from entering, or its movement restricted (i.e., speed restricted) within such maintenance areas. In one embodiment, central security control system 140 would receive location input data from the locomotive and determine the necessary security controls or limits to be applied and communicated back to the locomotive. In another embodiment, central security control system 140 is receives a notification from a locomotive of the occurrence of a security alert condition. In either embodiment, central security control system 140 may include computer instructions with regard to actions to be taken or may provide a display, alarm or reporting function whereby an attendant or railway system operator is alerted to the condition. In the later case, the attendant or system operator would provide input instructions to central security control system 140. Central security control system 140 would initiate actions and communicate control commands to the locomotive responsive to the computer instruction or the attendant or system operator input.

As noted above, a locomotive operates on a railway track network that covers a wide variety of routes, geography and facilities. The tracks of the railway track network traverse countries, states, territories, cities, railway yards, maintenance yards, and terminals. A railway operator may find it advantageous to define sub-networks of tracks or operating areas within the railway track network whereby the railway operator can define, specify or operator a locomotive operator in a particular operating area according to predefined rules, specifications or profiles. For example, one or more operating areas may be defined a security operating area or an emissions control operator, or restricted speed operating area. Any number of operating areas may be defined to meet the business needs of the railway operator. Each operating area may have one or more operating profiles associated therewith. Each operating profile would define one or more operating characteristics, operational parameters, limitations, restrictions, capabilities, or operator authorizations related to the operation of a locomotive operating within the operating area where the operating profile would apply.

Figure 2:
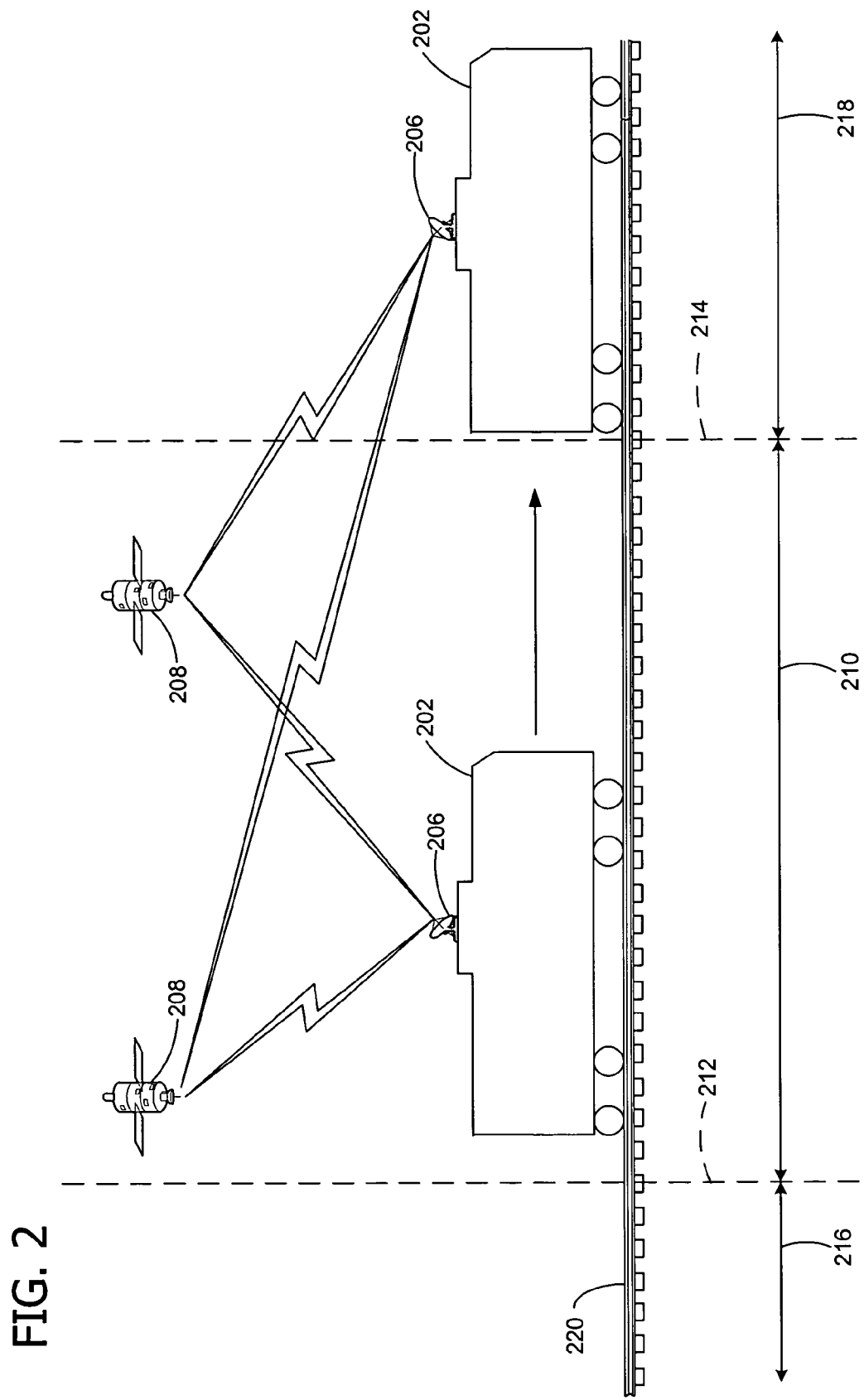
FIG. 2 is an illustration of operating a locomotive as a function of the location of the locomotive according to one embodiment of the invention.

Referring now to FIG. 2, a railway vehicle such as a locomotive 202 travels on railway track 220. Railway track 220 traverses three operating areas, 216, 210 and 218. Boundary 212 defines the boundary between operating area 216 and operating area 210. Similarly, boundary 214 defines the boundary between operating area 210 and operating area 218. As such, operating area 210 is defined as track 220 located between boundaries 212 and 214. Locomotive 202 traversing track 220 is illustrated as being located between boundaries 212 and 214 and is therefore located in operating area 210. However, locomotive 202 may traverse track 220 by passing to the left of boundary 212 and be located in operating area 216 or pass to the right of boundary 214 and be located in operating area 218.

As one example of an operating area in practice, a railway operator may define operating area 210 to be a railway yard. Boundaries 212 and 214 of operating area 210 would be defined to be the boundaries of the railway yard. In this example, the railway system operator may specify an operating profile for all locomotives operating within railway yard operating area 210. Such operating profile may include a security authorization level of an operator of locomotive 202. A second operating profile may be defined for operating area 216 and yet a third operating profile may be defined for operating area 218. Each of these operating profiles may have different security authorization levels for an operator. The operating profile and therefore the security authorization level required for operation of locomotive 202 would change based on the location of locomotive 202. For instance, the railway operator may restrict motoring of locomotive 202 within railway yard operating area 210 to operators with a high security level. Additionally the operating profile for railway yard operating area 210 may restrict throttle 120 to notches 1, 2 and 3. If an unauthorized operator attempts to motor or move locomotive 202 within operating area 210, control system 100 responding to the operating profile of operating area 210 would not allow locomotive 202 to motor, thereby overriding the manual input and control inputs of the operator. Additionally, the operating profile may restrict the operator from releasing the electronic parking brake thereby ensuring that locomotive 202 is not moved by the unauthorized operator. Furthermore, computer processor 102 may be configured to initiate alarm command 108 to generate audible alarm 124.

In the case where the operator is authorized to motor locomotive 202, the operator may be enabled to motor locomotive 202 at notch levels 1, 2 or 3. However, if the operator attempts to increase throttle 120 to notch level 4, control system 100 would override the manual input of the operator and inhibit locomotive 202 from operating at notch level 4. Additionally, control system 100 may be configured to initiate alarm command 108 or report the occurrence as a security alert condition if the operator attempts to deviate from the parameters and characteristics defined by the applicable operating profile.

Locomotive 202 may be equipped with a location determination device 114. One such device is shown in FIG. 2 as a GPS receiver 206. In this embodiment, GPS receiver 206 would receive one or more GPS positioning signals from one or more GPS satellites 208. Location determination device 114 would track the location of locomotive 202 along track 220. Control system 100 would determine the location of locomotive 202 and thereby a determination can be made as to the location of the locomotive as compared to pre-defined boundaries 212 and 214 or with regard to operating areas 216, 210, and 218. Once a determination of the location of locomotive 202 is made, control system 100 may determine the applicable operating profile to apply to the control and management of locomotive 202.

Another embodiment relates to the remote monitoring and instructing of control system 100, wherein control system 100 is located on a locomotive or locomotive support vehicle. As discussed above, remote locomotive control system 144 is in communication with communication interface 138 that in turn is connected to computer processor 102. Remote locomotive control system 144 communicates control commands to computer processor 102 to control one or more operations of locomotive 202. Such control commands may include setting a throttle setting, setting a mode of operation, set an operator security authorization requirement, disable one or more components of locomotive 202 or impose restrictions on the locomotive.

Locomotive 202 may communicate to remote locomotive control system 144 via secure communication link 142 one or more operating characteristics of locomotive 202 and the location of locomotive 202 as determined by location determination device 114. Remote locomotive control system 144 may be configured with computer instructions and/or user defined algorithms that utilize locomotive 202 provided information to determine the location of locomotive 202 with regard to one or more predefined operating areas, one of which may be a secure operating area. Remote locomotive control system 144 may also include predefined locomotive operating profiles that define one or more operating characteristics, parameters, controls, operating profiles, modes of operation, security requirements, or operator authorization requirements. An operating profile may be defined for a pre-established application or may be associated with one or more operating areas. For example, a security operating profile may define one or more characteristics for a locomotive operating in a secure operating area. Such a security operating profile may establish a security authorization parameter that limits the manual control of locomotive 202 to an operator with the necessary or minimal level of security authorization.

Remote locomotive control system 144 may be configured to communicate an operating profile, such as a security operating profile, to locomotive 202 as a function of the location of locomotive 202 and/or one or more of the operating characteristics of locomotive 202. Of course, the remote locomotive control system 144 may also communicate other commands or profiles to locomotive 202 such as to operate locomotive 202 at a reduced power level, to initiate utilization of hybrid energy, to operate at reduced emissions levels, or other operating objectives or requirements. Similarly, remote locomotive control system 144 may provide commands or profiles to change the power allocations of two or more locomotives configured as a consist or to provide a new movement plan to a consist or locomotive control system.

Remote locomotive control system 144 may also detect a security alert condition or a breech of a security parameter, characteristic, or profile based on the received location of locomotive 202 and/or an operating characteristic of locomotive 202. In one embodiment, when remote locomotive control system 144 detects the occurrence of the security alert condition, remote locomotive control system 144 would communicate a remote control command to computer processor to disable, modify or adjust one or more of the operations or operating characteristics of locomotive 202. For example, if a security alert condition or breech is detected, locomotive 202 may be restricted from operating in the motoring mode, the notch level of throttle 120 may be restricted, alarm command 108 may be initiated, and/or display data 128 sent to prompt the operator for operational authorization input device 136.

Remote locomotive control system 144 may be configured with any number of computer instructions or user-defined algorithms to define operating profiles or modes of operation for remotely controlling the operation of locomotive 202.

In another embodiment, control system 100 includes computer instruction stored in memory 104 for configuring computer processor 104 such that one or more of the functions described above, may be performed in whole or in part by control system 100 located on locomotive 202. In one embodiment, memory 104 includes computer readable instructions. In another embodiment, computer processor 102 may include algorithms that define the security alert condition or a breech of security. In one embodiment, the occurrence of a security alert condition is communicated via communication interface 138 via secure communication link 142 to central security control system 140. Additionally, other locomotive operating characteristics, parameters, and/or statistics may be communicated to central security control system 140.

Central security control system 140 or an attendant located at central security control system 140 may evaluate the received information and determine if the situation requires action. Central security control system 140 may initiate on its own or pursuant to instructions from the attendant the sending of a control command message to locomotive 202. Such a control command may limit or restrict one or more operations of locomotive 202. Additionally, central security control system 140 may serve as a report module and prompt locomotive 202 to provide additional information or data or to report again at a later timeframe. One example of a security alert condition is a locomotive operating outside of a programmed operating area. Control system 100 may monitor the location of locomotive 202 and compare the monitored location to one or more defined operating areas or boundaries. Locomotive 202 may be authorized to operator in a first and second operating areas. If control system 100 determines that locomotive 202 is operating outside of the first or second operating areas, say a third operating area (not shown), or has passed a predefined boundary, control system 100 may determine that a security alert condition is present. Computer processor 102 may send an alert message or alarm to central security control system 140. The railway system operator or attendant of central security control system 14 may select to initiate a remote control command to place the engine to idle and apply independent air brakes or electronic parking brakes. The remote control command is communicated to control system 100 wherein computer processor 102 initiates a control command to engine control hardware 106 in response to the remote control command to place the engine to idle.

In yet another embodiment, remote locomotive control system 144 initiates a remote control command that is communicated via secure communication link 142 to processor 102. Such a remote control command may be sent regardless of the occurrence of a security alert condition, the location of locomotive 202, or the authorization or authentication of the operator. For example, railway system operator may instruct remote locomotive control system 144 to initiate remote control commands to one or more locomotives based on the time of day, day of week, labor outage, emission rating, weather conditions, or for other external factors or situations.

The invention further includes methods for operating a locomotive. One such embodiment of a method for operating a locomotive is a method of managing and controlling an operation of a locomotive wherein locomotive 202 has at least two profiles of operation and locomotive 202 operates on a railway track comprised of at least two operating areas. In this embodiment, each operating area has a profile of operation associated with the operating area. The method comprises monitoring a location of locomotive 202 relative to one or more operating areas. Such location monitoring devices and methods are described above. The method further comprises controlling an operation of locomotive 202 as a function of the monitored location and the associated profile of operation. Systems and methods for controlling an operation of a locomotive are also discussed in detail above.

Another embodiment of a method for managing an operation of a locomotive comprising receiving a security authorization input from an operator of locomotive 202 and comparing the received operator security authorization input to a security authorization parameter. System and methods for receiving an operator authorization input 136 are discussed in detail above. The method further provides for restricting an operation of locomotive 202 when the received operator security authorization input 136 does not match the security authorization parameter. As discussed above, control system 100 or components thereof, or central security control system 140 may establish a security authorization level or parameter. Control system 100 or central security control system 140 receives operator security authorization input 136 of the operator and compares operator security authorization input 136 to the authorization parameter. If the operator security authorization input 136 does not match or is not at the proper level as defined by the authorization parameter, one or more operations of locomotive 202 are restricted. These controls are addressed above an may include restricting the operation of reverser 118, throttle 120, automatic engine start and stop (AESS) system 122, an inverter/converter 110, an alternator (not shown), air brakes 112, electronic parking brakes (not shown), traction motors 115, or energy storage system 148.

Yet another method of operating a locomotive includes a method of operating a locomotive as a function of a location of locomotive 202 and a security parameter of locomotive 202. The method comprises determining the location of locomotive 202 and determining the security parameter for locomotive 202 as a function of the determined location of locomotive 202. The method further comprises receiving a security authorization input from an operator of locomotive 202 and determining a control parameter as a function of the location of locomotive 202 and the comparison of the received security authorization input 136 from the operator and the determined security parameter. The method also includes controlling an operation of locomotive 202 responsive to the control parameter.

In another embodiment, a method of operating a locomotive comprises sending a control command from a remote system and receiving the control command at locomotive 202. A remote system may be another locomotive or may be central security control system 140 or remote locomotive control system 144. Sending may be transmission over the trainline communication facility or may be a wireless communication facility or a secure communication link 142, wherein the receiving is communication interface 138. The method also includes controlling an operation of locomotive 202 responsive to the received control command. Controlling an operation of locomotive 202 is discussed above.

The systems and methods described herein may be implemented locally within each locomotive in a consist so that locomotive 202 control system of a particular locomotive in the consist can be locally controlled by a locomotive control system of another locomotive in the consist. Additionally, control system 100 of a locomotive in a consist may control the operation of one or more other locomotives in the consist, some of which may not be equipped with control system 100.

As another embodiment of the invention, control system 100 may control one or more operations of locomotive 202 as a function an emission characteristic and/or emission profile. An emission characteristic may be one or more operating characteristics of a locomotive that are indicative of the emissions being generated by the locomotive. An emission profile may be an operating profile that describes and defines the desired emissions performance/output of the locomotive. As described above, such an emission profile may be associated with one or more operating area. For instance, an operating area such as a city or state may have emission control areas with specified emissions objectives, and an adjacent operating area (e.g., city, state) may have an emission control area with different emission objectives. For example, the emission objectives of associated with one operating area may be lower than emission objectives associated with an adjacent operating area. As such, an emission profile for a second state may define or specify one or more emission or control characteristics that result in a lower emissions output of the locomotive than would be defined or specified by an operating profile of a first state. In other embodiment, the emission profile or emission objective/characteristic may be defined as a function of the time of day, weather, daily emission rating/classification, train pull weight, consist configuration, movement plan, rail conditions, age or type of locomotive, and/or business objective of the railway system operator.

Optionally, by monitoring an emission parameter of the operating locomotive via the monitoring unit 121, the operating parameter may be compared to the emission profile or an emission characteristic/objective as defined by the emission profile or otherwise. Control system 100 may determine that an adjustment to one or more operating characteristics of the locomotive 202 is required. For example, if the monitored emission parameter is a chemical or gas output of the diesel engine and it is monitored as being higher than specified by the emission characteristic, control system 100 may initiate a command to engine control hardware 106 such as to change the engine timing schedule or another control intended to reduce the emissions being generated by the diesel engine. Other corrective actions may include shutting down the engine, adjusting locomotive assignments within a consist or a train, adjusting one or more movement plans for a train, change engine cooling, change engine load or tractive effort, change the engine speed, utilizing hybrid energy for motoring, or storing hybrid energy in an energy storage system. Such action may be taken to achieve the emission characteristic for a particular locomotive or may be taken on a system wide or sub-system basis in order to achieve an emission objective for a fleet of locomotives and trains operated by a railway systems operator operating in one or more operating areas.

In such an embodiment, the emission profile and the assignment of the emission profile to an operating area may be determined by a remote system or by control system 100. Such determinations may be based on a calculated real time fleet average emission rather than merely based on the emission as monitored at a single locomotive. In this case, control system 100 may communicate operational characteristics and data related to the operation of the locomotive 202 such as the current engine state, time in a notch position, timing schedule, AESS system 122 status, and other operating statistics as described in part above. Optionally, an alarm 124 or message to a remote center may be generated when an emission characteristic is not being achieved by the emission parameter being monitored.

An additional option to such control system 100 managing a locomotive based on the location of the locomotive and an emission characteristic would be to generate and distribute reports of the monitored emission parameters, associated regulatory reports and regulatory compliance reports or documents. Such a system may also include the capability to calculate, track, manage and trade emissions credits that relate to achieving regulatory compliance.

As can now be appreciated, the systems and methods herein described provide substantial advantages over the prior art. Such advantages include managing and operating a locomotive as a function of the location of locomotive 202 in a railway network. Another advantage is providing increased security to the operation of locomotive 202 including verifying the authorization and/or authentication of the operator of locomotive 202 to operate one or more operational functions of locomotive 202. Also among the advantages is remotely controlling one or more operations of locomotive 202 either in place of an operator being located on locomotive 202 or in support of or as an override to an operator control input. Significantly, the system and method herein described may also be adapted for use with existing locomotive and train systems.

Figure 3:
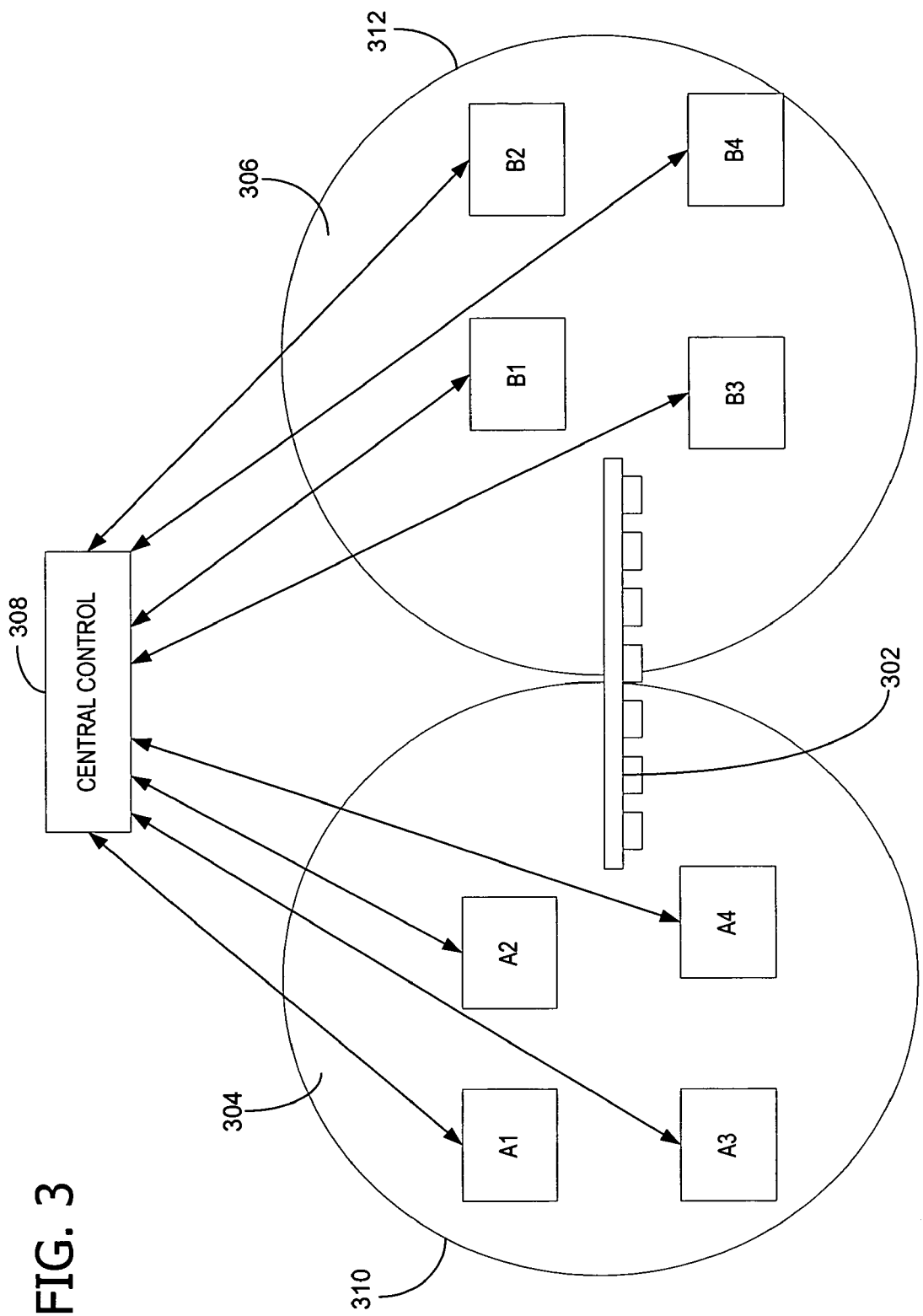
FIG. 3 is an illustration of operating a fleet of locomotive as a function of the location of one or more locomotive according to one embodiment of the invention.

Referring now to FIG. 3, a fleet, or plurality, of OHVs such as railway locomotives A1, A2, A3, and A4 travel on one or more railway tracks 302 within a first operating area 304, and a plurality of railway locomotives B1, B2, B3, and B4 travel on the same one or more railways tracks 302 within a second operating area 306. Thus, railway tracks 302 traverse both operating areas 304 and 306. Boundary 308 defines the first operating area, and boundary 310 defines the second operating area. A central control unit 308 is configured to send control commands from a remote location such as a regional control center to each of the plurality of locomotives in each of the first and second operating areas 304, 306. As described above in reference to FIG. 2, sending commands may involve sending transmissions over the trainline communication facility or may involve transmissions via a wireless communication facility, or a secure communication link (e.g., 142). The central control unit 308 also includes a location determination device (e.g., 114) configured to determine a location of each of the plurality of locomotives relative to the operating areas 304, 306. Once a determination of the location for each of the locomotives is made, the control unit 308 may determine the applicable operating profile to apply to the control and management of each of the plurality of locomotives.

The first operating area 304 may have a one emission characteristic or objective defined by local or regional regulation for locomotives operating therein, and the second operating area may have a different emission characteristic or objective, which may be more or less stringent than the emission characteristic or objective associated with the first operating area. In one embodiment, the central control unit 308 provides a method for managing one or more locomotives depending on the location (i.e., the particular operating area) in which the locomotives are located. For example, if the first operating area is an emission control area requiring a specified emission characteristic, the control unit manages the operation of locomotives A1–A4 as a function of their determined location within the first operating area, and an emission characteristic of each of the off highway vehicles (A1–A4). After the central control unit determines that locomotives A1, A2, A3, and A4 are located within the first operating area 304, the central control unit 308 monitors the emission parameter of each of the locomotives A1–A4. The control unit 308 then determines a control parameter as a function of the emission characteristic of the first operating area 304, the monitored emission parameters, and the determined emission characteristics associated with each of the locomotives A1–A4. Thereafter, the control unit 308 controls the operation of each of the locomotives A1–A4 in response to the determined control parameter by communicating commands or profiles to each of the locomotives A1–A4.

For example, as described above, if the monitored emission parameter is a chemical or gas output of diesel engines and it is monitored as being higher than specified by the emission characteristic, control unit 308 initiates a command to engine control hardware 106 such as to change the engine timing schedule or another control intended to reduce the emissions being generated by diesel engines of one or more of the locomotives A1–A4. The control unit 308 may also initiate commands to operate one or more of the locomotives at a reduced power level, to initiate utilization of hybrid energy, to operate at reduced emissions levels, or other operating objectives or requirements. Similarly, central control unit 308 may provide commands or profiles to change the power allocations of two or more locomotives configured as a consist or to provide a new movement plan to a consist or locomotive control system (e.g., route OHV thru different operating area). Moreover, central control unit 308 can calculate, track, and manage trade emissions credits that relate to achieving regulatory compliance.

In one embodiment, the central control unit 308 is also configured to send control commands to each of the plurality of locomotives in each of the first and second operating areas 304, 306 to manage the control of security and security-related functions of the locomotives. For instance, the control unit 308 may perform similar remote control functions as remote locomotive control system 144 but may specifically monitor and manage the control of security and security-related functions of the locomotives operating in the first and second operating areas. For instance, if an operator on board the locomotive B1 is immobilized and/or otherwise unable to control operation of the locomotive (e.g., runaway train), control commands can be used shutdown the locomotive B1. For example, if the operator on board the locomotive is immobilized remote control commands can be used to activate a dump valve (not shown) to dump air pressure and automatically engage air brakes.

Although the invention is substantially described herein for controlling locomotives, it is contemplated the method and system of the present invention can be used to control other Off Highway Vehicles.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several objects of the invention are achieved and other advantageous results attained.

As various changes could be made in the above exemplary constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A method of managing operation of a locomotive that moves between at least two operating areas, said locomotive traveling along a path comprised of the at least two operating areas, each operating area having at least one location profile associated therewith, with the location profile of one of the operating areas being different from that of a second one of the operating areas, said method comprising:
   monitoring a location of the locomotive to determine its operating area; and
   determining a location profile associated with the determined operating area;
   controlling an operation of the locomotive as a function of the determined operating area and the associated location profile, said location profile being selected from a group comprising a security profile and an emission profile, wherein said security profile includes a restriction on an operation of the locomotive based on its position relative to a security control area, and wherein said emission profile includes a restriction on an operation of the locomotive based on its position relative to an emission control area.

2. The method of claim 1 further including managing a plurality of locomotives operating in the determined operating area to manage total emissions of all locomotives within the determined operating area.

3. The method of claim 1 wherein one of the location profiles is a security profile, said security profile includes a restriction on an operation of the locomotive while traveling on a portion of the path that is located in a security control area.

4. The method of claim 3 further including managing a plurality of locomotives operating in the determined operating area to manage restrictions on operation of all locomotives within the determined operating area, wherein the determined operating areas is a security control area, said security control area having said security profile associated therewith.

5. The method of claim 1 wherein the security profile includes a valid security authorization parameter required by an operator of the locomotive, further comprising receiving a security authorization input from the operator of the locomotive and comparing the security authorization input received from the operator to the required security authorization parameter to determine if the received security authorization input is valid, and wherein the operator is allowed to operate the locomotive when the received security authorization parameter is valid.

6. The method of claim 5 wherein the security authorization input is received either from an operator located on-board the locomotive or from an operator located off-board the locomotive.

7. The method of claim 5 wherein receiving the security authorization input of the operator comprises receiving a security authorization input from a card key presented by the operator.

8. The method of claim 5 wherein controlling an operation of the locomotive comprises restricting or inhibiting an operation of one or more components of the locomotive when the received security authorization input of the operator does not match the required security authorization parameter of the security profile.

9. The method of claim 5 wherein the operator is an administrative system or device located on-board the locomotive or off-board the locomotive.

10. The method of claim 1 wherein a first operating area has a first location profile of operation and a second operating area has a second location profile, further comprising changing the location profile of the locomotive from the first location profile to the second location profile when the locomotive moves to the second operating area from the first operating area.

11. The method of claim 1 wherein a second locomotive is operably coupled in a consist configuration with the locomotive, further comprising controlling an operation of the second locomotive as a function of the determined operating area and the associated location profile of the first locomotive.

12. The method of claim 1 further comprising monitoring an operating characteristic of the locomotive, said operating characteristic being representative of one or more operations of the locomotive, and wherein said controlling an operation includes controlling the operation of the locomotive as a function of the monitored operating characteristic.

13. The method of claim 12 wherein an operating characteristic of the locomotive is selected from the list of: throttle setting, engine speed, fuel mixture, mechanical braking, air braking, automatic braking, engine cooling, energy storage, engine firing, hybrid energy use, dynamic braking, emission output, and tractive effort.

14. The method of claim 1 wherein controlling an operation of the locomotive includes controlling one or more operations of the locomotive from the list: throttle, reverser, tractive effort, air braking, electronic mechanical braking, dynamic braking, engine speed, engine operation, engine load, and motoring profile.

15. The method of claim 1 wherein the emission profile defines one or more emission levels or characteristics of the locomotive.

16. The method of claim 1 wherein the emission profile defines one or more emission levels or characteristics for a plurality of locomotives.

17. The method of claim 16 wherein one of the at least two operating areas is an emission control area, and wherein managing the operation of a plurality of locomotives includes operating each of the plurality of locomotives as a function of a location of the plurality of locomotives and an emission characteristic of one or more of the plurality of locomotives, the method comprising:

determining a location for each of the plurality of locomotives;

determining the emission characteristic for each of the one or more plurality of locomotives having a determined location within the same emission control area;

monitoring an emission parameter of each of the one or more plurality of locomotives determined to be within the same emission control area;

determining a control parameter as a function of the determined location of the one or more plurality of locomotives and as a function of the monitored emission parameters and the determined emission characteristics; and controlling an operation of the each of the one or more plurality locomotives responsive to the control parameter.

18. The method of claim 17 wherein controlling includes calculating, tracking, managing and trading emissions credits for each of the one or more plurality of locomotives within the emission control area.

* * * * *